(12) United States Patent
Fontanazzi

(10) Patent No.: US 6,199,685 B1
(45) Date of Patent: Mar. 13, 2001

(54) REJECT DEVICE FOR A HIGH-SPEED PACKING MACHINE

(75) Inventor: Paolo Fontanazzi, Modena (IT)

(73) Assignee: Tetra Laval Holdings & Finance S.A., Pully (CH)

(*) Notice: Subject to any disclaimer, the term of this patent is extended or adjusted under 35 U.S.C. 154(b) by 0 days.

(21) Appl. No.: 09/080,263

(22) Filed: May 18, 1998

(30) Foreign Application Priority Data

Jun. 27, 1997 (EP) ................................................ 97830317

(51) Int. Cl.[7] ........................................................ B65G 47/04
(52) U.S. Cl. ........................................................ 198/532
(58) Field of Search ...................... 198/536, 890, 198/369.1, 457.07, 457.01, 442, 451, 452, 532, 530, 598; 193/369.2, 369.3, 29, 31 A, 14

(56) References Cited

U.S. PATENT DOCUMENTS

| | | | |
|---|---|---|---|
| 3,193,078 | * | 7/1965 | Amenta et al. |
| 4,003,465 | * | 1/1977 | Bauer ................................. 198/442 |
| 4,147,248 | * | 4/1979 | Kurczak et al. ...................... 198/358 |
| 4,158,624 | * | 6/1979 | Ford et al. ........................... 209/523 |
| 5,531,310 | | 7/1996 | Itoh . |
| 5,657,858 | * | 8/1997 | Goor ................................... 198/890 |
| 5,964,562 | * | 10/1999 | Bernard, II et al. ............. 414/331.03 |

FOREIGN PATENT DOCUMENTS

| | | |
|---|---|---|
| 129 639A | 2/1978 | (DE) . |
| 79 10 291 | * 6/1980 | (DE) . |
| 7910291 U | 6/1980 | (DE) . |
| 3342878 | 6/1985 | (DE) . |
| 05305926A | 11/1993 | (JP) . |

* cited by examiner

Primary Examiner—H. Grant Skaggs
Assistant Examiner—Khoi H. Tran
(74) Attorney, Agent, or Firm—Burns, Doane, Swecker & Mathis, L.L.P.

(57) ABSTRACT

A reject device (1) for a high-speed packaging machine (2), the device having an input opening (23) for a succession of packages (3) containing pourable food products and traveling along a supply path (A); a first guide surface (18) for guiding the packages (3) along a transfer path (B) to an output station (13, 30); a second guide surface (19) for guiding the packages (3) along an expulsion path (C) intersecting the supply and transfer paths (A, B); and a selecting member (22) located at the intersection of the supply, transfer and expulsion paths (A, B, C), and which has a first and a second wall (32, 33) facing and connected integrally to each other, and rotates, about a fixed hinge axis (E) crosswise to the supply path (A), between a first operating position wherein the first wall (32) is substantially aligned with the first guide surface (18) to direct the packages (3) along the transfer path (B), and a second operating position wherein the second wall (33) is substantially aligned with the second guide surface (19) to direct the packages (3) along the expulsion path (C). (FIG. 2)

8 Claims, 3 Drawing Sheets

REJECT DEVICE FOR A HIGH-SPEED PACKING MACHINE

BACKGROUND OF THE INVENTION

1. Field of the Invention

The present invention relates to a reject device for a high-speed packaging machine for continuously producing aseptic sealed packages, containing pourable food products, from a tube of packaging material.

2. Brief Description of the Related Art

Many pourable food products, such as drinks, fruit juice, pasteurized or UHT (ultra-high-temperature treated) milk, wine, tomato sauce, etc., are sold in packages made of sterilized packaging material.

A typical example of such a package is the parallelepiped packaging container for liquid or pourable food products known by the name of Tetra Brik Aseptic (registered trademark), which is formed by folding and sealing a strip-rolled packaging material.

The rolled packaging material comprises layers of fibrous material, e.g. paper, covered on both sides with thermoplastic material, e.g. polyethylene; and the side of the packaging material eventually contacting the food product in the package also comprises a layer of barrier material, e.g. an aluminium sheet, in turn covered with a layer of thermoplastic material.

As is known, packages of the above type are produced on fully automatic packaging machines, on which a continuous tube is formed from the packaging material supplied in strip form. The strip of packaging material is sterilized on the packaging machine, e.g. by applying a chemical sterilizing agent, such as a hydrogen peroxide solution; following sterilization, the sterilizing agent is removed, e.g. vaporized by heating, from the surfaces of the packaging material; and the strip of packaging material so sterilized is kept in a closed sterile environment, and is folded and sealed longitudinally to form a tube.

The tube is filled with the sterilized or sterile-processed food product, and is sealed at equally spaced cross sections at which it is then cut into pillow-pack packets, which are subsequently folded mechanically into parallelepiped packages.

Known packaging machines normally comprise a reject device for rejecting any packages not guaranteed perfectly aseptic.

Such devices substantially comprise a supply station supplied successively with the packages; first guide means for guiding the packages along a transfer path to an output station; second guide means for guiding the packages along an expulsion path intersecting the transfer path; and a selecting member comprising a movable partition located at the intersection of the two paths, and rotating about a fixed hinge axis between a first operating position connecting the supply station and the first guide means, and a second operating position connecting the supply station and the second guide means.

A major drawback of reject devices of the above type is that, as the output rate of the packaging machine increases, the movable partition tends to interact abnormally with the packages fed through at high speed, and is subject to jamming, thus resulting in stoppage of the production cycle.

OBJECTS AND SUMMARY OF THE INVENTION

It is an object of the present invention to provide a straightforward, reliable reject device for a high-speed packaging machine, designed to overcome the aforementioned drawback typically associated with known devices.

According to the present invention, there is provided a reject device for a high-speed packaging machine, the device comprising an input opening for a succession of packages containing pourable food products and traveling along a supply path; a first guide surface for guiding said packages along a transfer path to an output station; a second guide surface for guiding said packages along an expulsion path intersecting said supply and transfer paths; a selecting member located at the intersection of said supply, transfer and expulsion paths, and rotating, about a fixed hinge axis crosswise. to said supply path, between a first operating position connecting said input opening and said first guide surface, and a second operating position connecting said input opening and said second guide surface; and actuating means for rotating said selecting member between said first and second operating positions; characterized in that said selecting member comprises a first and a second wall facing and connected integrally to each other; said first wall, in said first operating position of said selecting member, being substantially aligned with said first guide surface to direct said packages along said transfer path; and said second wall, in said second operating position of said selecting member, being substantially aligned with said second guide surface to direct said packages along said expulsion path.

BRIEF DESCRIPTION OF THE DRAWING FIGURES

A preferred, non-limiting embodiment of the present invention will be described by way of example with reference to the accompanying drawings, in which.

DETAILED DESCRIPTION OF THE PREFERRED EMBODIMENTS

Figure 1:
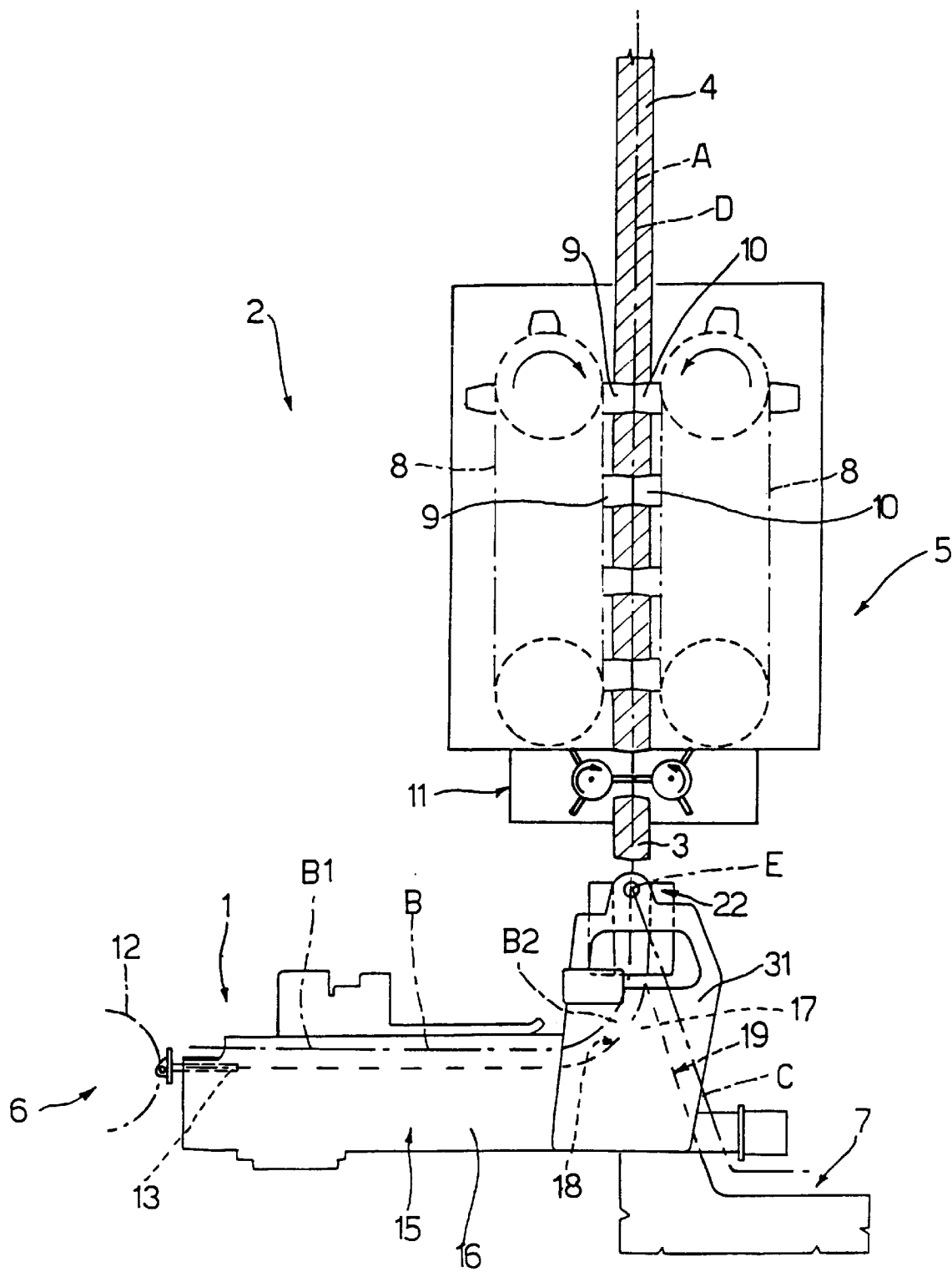
FIG. 1 shows a partial schematic side view of a high-speed packaging machine featuring a reject device in accordance with the present invention.
Figure 2:
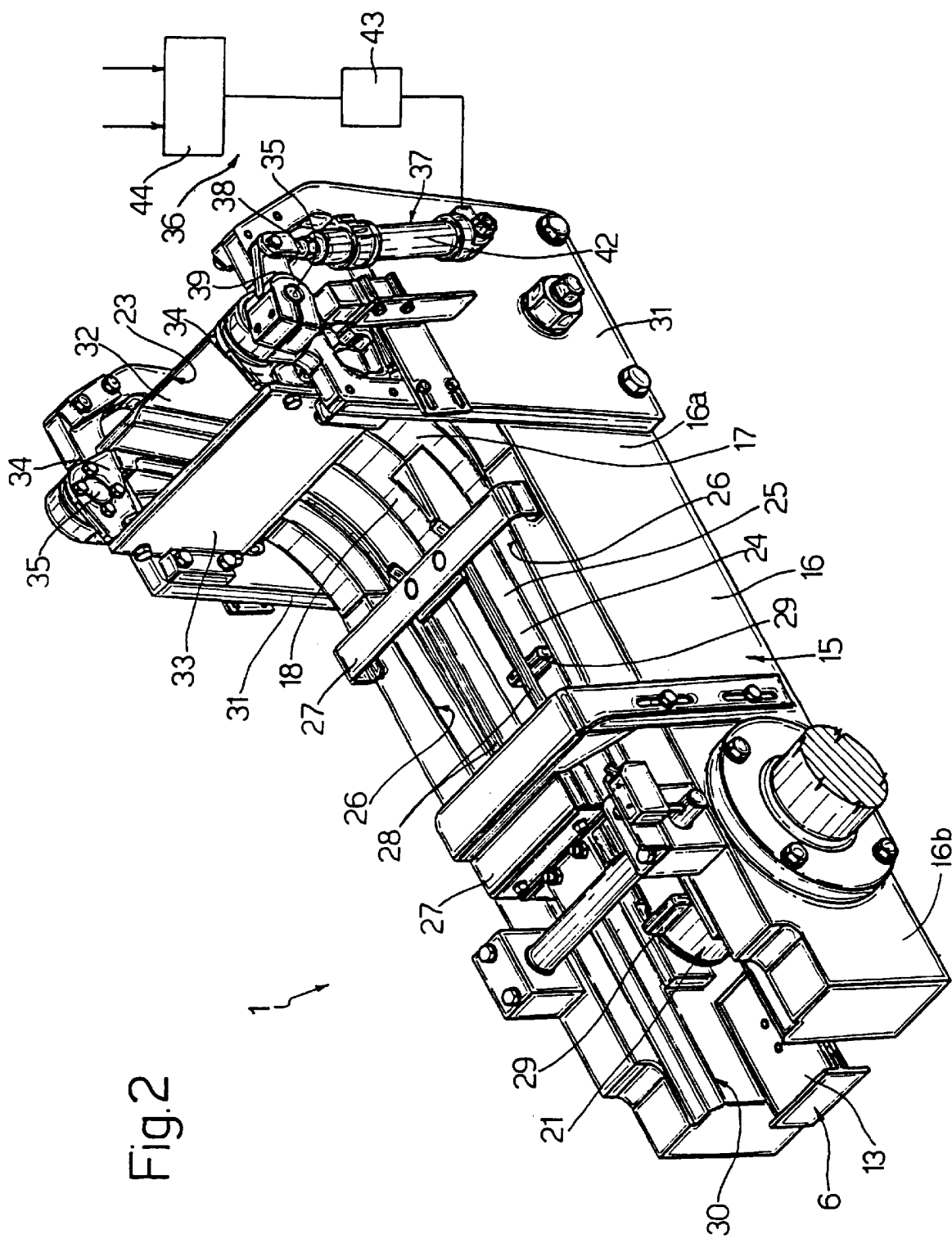
FIG. 2 shows a larger-scale view in perspective of the FIG. 1 reject device.

Number 1 in FIGS. 1 and 2 indicates a reject device for a high-speed packaging machine 2 (shown only partly and schematically) for continuously producing aseptic sealed packages 3, e.g. of substantially parallelepiped shape, and containing a pourable food product such as pasteurized or UHT milk, fruit juice, wine, etc., from a strip-rolled packaging material having, on the side facing outwards of packages 3, a number of equally spaced preprinted designs (not shown).

As is known, after being fed through a known sterilizing station (not shown) where it is treated with a sterilizing agent, e.g. hydrogen peroxide, the packaging material is folded and sealed along a longitudinal line to form a continuous vertical tube 4 (FIG. 1) which is subsequently filled with the food product; and to prevent absorption by the packaging material along the longitudinal sealing line, this is applied with a protective strip, also strip-rolled.

As shown in FIG. 1, device 1 defines a transfer unit of machine 2, and provides for selectively feeding packages 3—traveling along a vertical supply path A from a forming unit 5 (not forming part of the present invention and therefore shown only schematically) located upstream from device 1—along a transfer path B to a follow-up folding unit 6 (not forming part of the present invention and therefore shown only partly), or to a reject package collecting area 7 along an expulsion path C, the upstream end of which intersects paths A and B.

More specifically, path B comprises a downstream portion $B_1$ preferably but not necessarily extending in a substantially horizontal direction and adjacent to folding unit 6, and an upstream portion $B_2$ connecting path A to portion $B_1$; and path C is an oblique straight portion extending between path B and area 7.

Packages 3 are fed to device 1 in an input position, in which a respective axis D (FIGS. 1, 3 and 4) is positioned vertically and aligned with path A, and are transferred to folding unit 6 in an output position, in which axis D is positioned horizontally and aligned with path B.

Forming unit 5 (only the main elements of which are described briefly for a clearer understanding of the present invention) substantially comprises two chain conveyors 8 located on either side of tube 4 of packaging material, and respectively having jaws 9 and counter-jaws 10 cooperating with each other to seal tube 4 at equally spaced cross sections; and a cutting assembly 11 for cutting tube 4 at said sealed sections to form packages 3, which are then fed by gravity along path A to device 1.

As the distance between packages 3, as they fall freely from forming unit 5, increases due to gravitational acceleration, device 1 is advantageously so positioned along free-fall path A that packages 3 are separated by a distance sufficient for them to interact one at a time with device 1.

Folding unit 6 substantially comprises a chain conveyor 12 having a number of flat rectangular blades 13 (only one shown), which support respective packages 3 parallel to blades 13, and travel, close to device 1, along a curved trajectory approximating a vertical direction parallel to path A and perpendicular to blades 13.

Figure 3:
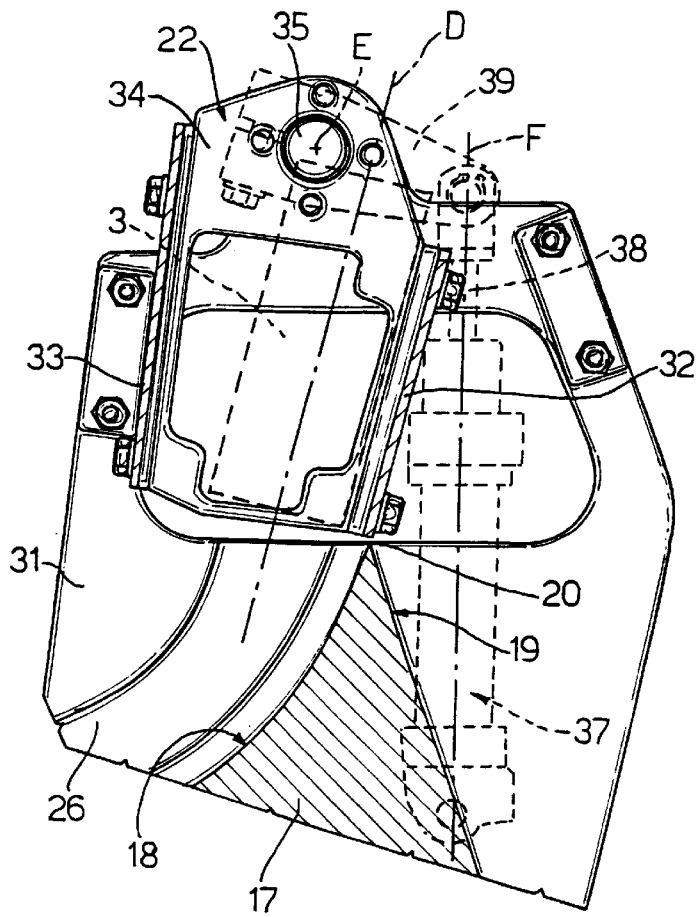
FIGS. 3 and 4 show larger-scale longitudinal sections of a detail of the FIG. 2 reject device in two different operating positions.
Figure 4:
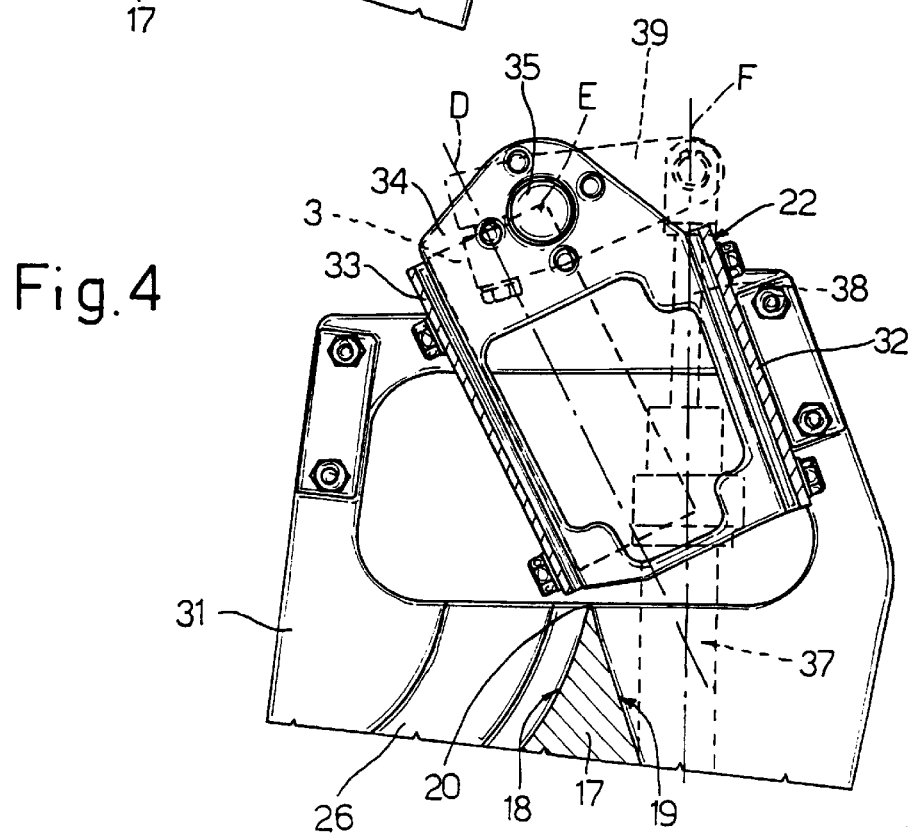

With reference to FIGS. 2 to 4, device 1 comprises a base 15 located below cutting assembly 11 and defined by two spaced, elongated side walls 16 extending in the direction of portion $B_1$ of path B, and by a wedge-shaped portion 17 interposed between respective end portions 16a of side walls 16 and for receiving packages 3 from cutting assembly 11 by force of gravity, and directing them along path B or C. More specifically, portion 17 is defined at the top towards cutting assembly 11 by two chutelike guide surfaces 18, 19 extending from a common edge 20 of portion 17 and respectively defining portion $B_2$ of path B and path C.

Surfaces 18, 19 are oblique and inclined in opposite directions with respect to path A. More specifically, surface 18 is a curved, outwardly-concave surface, while surface 19 is a flat surface.

As the time taken to transfer packages 3 from forming unit 5 to folding unit 6 may vary according to the variable degree of friction generated between each package 3 and surface 18, blades 13 are designed to permit continuous operation of folding unit 6 even in the event of minor irregularities in the supply of packages 3.

Device 1 also comprises a belt conveyor 21 fitted between side walls 16 of base 15 and for feeding packages 3 from surface 18 to folding unit 6; and a selecting member 22 located immediately upstream from portion 17, having an input opening 23 for packages 3 from cutting assembly 11, and fitted to base 15 so as to rotate, about an axis E perpendicular to path A and to portion $B_1$ of path B, between a first operating position (FIG. 3) connecting opening 23 to surface 18 to feed packages 3 along path B, and a second operating position (FIG. 4) connecting opening 23 to surface 19 to feed packages 3 along path C.

More specifically, conveyor 21 is synchronized with cutting assembly 11, and comprises a drive pulley and a driven pulley (not shown), and a belt 24 looped about the pulleys and having a horizontal conveying branch 25, which is located on an extension of surface 18, extends towards folding unit 6 from the bottom end, opposite edge 20, of surface 18, and defines portion $B_1$ of path B.

As shown in FIGS. 1, 3 and 4, side walls 16 of base 15 project upwards with respect to branch 25 of belt 24 and surface 18 of portion 17, so as to define respective lateral retaining walls 26 for retaining packages 3 along path B.

Base 15 also comprises two bridge elements 27 crosswise to branch 25 of belt 24 and fixed at opposite ends to the top of respective intermediate portions of side walls 16; and two substantially straight guide sections 28 connected integrally to one or more elements 27 and extending parallel to each other and to belt 24. Together with belt 24 and retaining walls 26, sections 28 define, for packages 3 from portion 17, a compulsory passage whereby to set packages 3 to the output position.

Belt 24 also comprises a number of equally spaced blades 29, which cooperate with sections 28 and retaining walls 26 to feed packages 3 in equally spaced manner along portion $B_1$ of path B. More specifically, each element 27 defines a brake cooperating with packages 3 to ensure they are positioned contacting respective blades 29 of conveyor 21.

Side walls 16 also comprise respective end portions 16b opposite portions 16a and projecting longitudinally with respect to conveyor 21 to define a through seat 30, which is engaged, in use, by a blade 13 to receive a respective package 3 from conveyor 21. More specifically, the blade 13 engaging seat 30 at a given point in the production cycle is positioned horizontally and substantially coplanar with branch 25 of belt 24, and defines, with seat 30, an output station at which packages 3 are fed off device 1.

Base 15 also comprises a pair of plates 31 bolted externally to portions 16a of respective side walls 16, and which project upwards with respect to side walls 16, and, in between, support selecting member 22 in rotary manner about axis E.

According to the present invention, selecting member 22 comprises a pair of walls 32, 33 facing and connected integrally to each other, and of which a first (32), in said first operating position of selecting member 22 (FIG. 3), is aligned with surface 18 to direct packages 3 along path B, while the other (33), in said second operating position of selecting member 22 (FIG. 4), is aligned with surface 19 to direct packages 3 along path C.

More specifically, walls 32, 33 preferably, but not necessarily, slope slightly with respect to each other, and converge towards portion 17 of base 15. Moreover, walls 32, 33 are connected integrally to each other by a pair of frame-shaped transverse elements 34, the top edges of which, together with respective top edges of walls 32, 33, define opening 23.

Elements 34 face and are connected to the top of respective top portions of plates 31 by respective hinge pins 35 of axis E.

With reference to FIGS. 2 to 4, device 1 also comprises an actuating assembly 36 for activating selecting member 22, and which in turn comprises a pneumatic cylinder 37 fitted to one of plates 31 and having a rod 38 movable along a respective vertical axis F parallel to path A, and a lever 39 having one end hinged to the free top end of rod 38, and a substantially jaw-shaped opposite end engaged by and locked integrally to respective pin 35.

Rod 38 is movable between a withdrawn position almost entirely housed inside a respective jacket 42 of cylinder 37 and maintaining selecting member 22 in the first operating position, and a forward position projecting almost entirely from jacket 42 and maintaining selecting member 22 in the second operating position.

Finally, cylinder 37 is controlled, via the interposition of a solenoid valve 43, by an electronic control unit 44, which controls machine 2 and is input-connected to a number of known monitoring sensors (not shown) at predetermined locations inside machine 2.

In actual use, selecting member 22 is normally set to the first operating position to direct packages 3—falling by gravity from cutting assembly 11 through opening 23—along surface 18; and the concave profile of surface 18 provides for sliding packages 3 smoothly onto branch 25 of belt 24, by which they are fed to folding unit 6. As they are transferred from surface 18 onto belt 24, packages 3 are guided at the top by sections 28 and laterally by retaining walls 26; and blades 29 projecting from belt 24 ensure packages 3 are fed in equally spaced manner along portion $B_1$ of path B.

Selecting member 22 is switched from the first to the second operating position by control unit 44 whenever the aseptic nature of packages 3 coming off forming unit 5 fails to be ensured, and more specifically, when the monitoring sensors determine any irregularity in the operating cycle of machine 2, or during the inevitable transient operating states of machine 2.

By way of example, the following are just some of the transient operating states inevitably requiring the rejection of a certain number of packages 3.

At the start of the production cycle of machine 2, the sterilizing station contains a portion of the strip of packaging material, which has been left at the station for a prolonged period of time, since the end of the previous cycle, and the fibrous layer of which has absorbed the sterilizing agent, so that any packages 3 made from said strip portion are rejected to safeguard the quality of the packages or the product contained in the packages and subsequently supplied to the consumer.

Moreover, whenever the supply reel of packaging material runs out and is replaced by a new reel, a transverse splice must be made by heat-sealing the packaging material on the two reels. Though the aseptic nature of the packages may still be ensured, any packages 3 with a transverse splice are rejected to safeguard the quality of the packages. The same obviously also applies when the reels supplying the protective strip applied along the sealing line of tube 4 run out and are replaced, in which case, any packages 3 with spliced protective strips are rejected to safeguard the quality of the packages.

Finally, selecting member 22 is set to the second operating position whenever the sensors monitoring machine 2 detect a positioning error of the designs on packages 3 over and above a predetermined threshold value and repeated for a predetermined number of packages 3; which situation obviously indicates a malfunction on machine 2.

In all the above cases, for safety reasons, the number of packages 3 rejected is always considerably greater than the number actually affected by the problems in question.

The advantages of device 1 according to the present invention will be clear from the foregoing description.

In particular, selecting member 22 is reset rapidly by control unit 44, and, by featuring two walls 32, 33, each for directing packages 3 along a respective path B, C, provides for optimum guidance of packages 3 in both operating positions, and may therefore be used to advantage on continuous packaging machines operating at a high output rate (e.g. 8000–24000 packages an hour).

Clearly, changes may be made to device 1 as described and illustrated herein without, however, departing from the scope of the claims.

What is claimed is:

1. A reject device for a high-speed packaging machine comprising:
    a substantially vertical supply path;
    an input opening oriented to receive a succession of packages containing pourable food products and traveling along said substantially vertical supply path;
    a first guide chute surface for guiding said packages from said substantially vertical supply path along a transfer path to an output station;
    a second guide chute surface for guiding said packages along an expulsion path intersecting said substantially vertical supply path and said transfer path;
    a selecting member located at the intersection of said supply path, said transfer path, and said expulsion path, and rotating, about a fixed hinge axis crosswise to said substantially vertical supply path, between a first operating position connecting said input opening and said first guide chute surface, and a second operating position connecting said input opening and said second guide chute surface; and
    actuating means for rotating said selecting member between said first and second operating positions;
    wherein said selecting member comprises a first and a second wall facing and connected integrally to each other;
    wherein said first wall, in said first operating position of said selecting member, being substantially aligned with said first guide chute surface to direct said packages falling by gravity from said substantially vertical supply path along said transfer path; and
    wherein said second wall, in said second operating position of said selecting member, being substantially aligned with said second guide chute surface to direct said packages along said expulsion path.

2. A device as claimed in claim 1, wherein said first and second walls of said selecting member are connected integrally to each other by a pair of transverse elements, and, together with the transverse elements, define said input opening.

3. A device as claimed in claim 1, further comprising wedge-shaped diverting means intercepting said packages along said supply path, said diverting means comprising said first and second guide chute surfaces for respectively directing the packages along said transfer and expulsion paths.

4. A device as claimed in claim 3, wherein said supply path is a vertical path, and said packages are fed by gravity to said input opening;
    said device comprising a base;
    said diverting means comprising a wedge-shaped portion of said base defined externally by said first and second guide chute surfaces; and
    said first and second guide chute surfaces each being substantially in the form of a chute and diverging with respect to each other from a common edge of said wedge-shaped portion.

5. A device as claimed in claim 4, wherein said first and guide chute surfaces each comprise oblique surfaces with respect to said supply path;

said first guide chute surface comprising an outwardly-concave surface; and said second guide chute surface comprising a substantially flat surface.

6. A device as claimed in claim 4, further comprising:

belt conveying means fitted to said base and having a conveying branch for conveying said packages, said belt conveying means extending between said first guide chute surface and said output station and being located on an extension of said first guide chute surface;

said transfer path comprising a straight downstream portion defined by the conveying branch of said belt conveying means, and a curved upstream portion connecting said downstream portion to said supply path and defined by said first guide chute surface.

7. A device as claimed in claim 4, wherein said base comprises two plates located on opposite sides of said wedge-shaped portion and projecting upwards with respect to the wedge-shaped portion, said selecting member being interposed between said plates and is connected to said plates so as to pivot about said hinge axis.

8. A device as claimed in claim 7, wherein said actuating means comprises:

a pneumatic cylinder fitted to one of said plates and having a rod movable along a respective axis substantially parallel to said supply path, said rod including a free end; and a lever having one end hinged to said free end of said rod and an opposite end connected to said selecting member.

* * * * *